(12) United States Patent
Fiore

(10) Patent No.: US 11,912,585 B1
(45) Date of Patent: Feb. 27, 2024

(54) PORTABLE WATER COLLECTION AND FILTERING DEVICE

(71) Applicant: Laura Shannon Fiore, San Diego, CA (US)

(72) Inventor: Laura Shannon Fiore, San Diego, CA (US)

( * ) Notice: Subject to any disclaimer, the term of this patent is extended or adjusted under 35 U.S.C. 154(b) by 0 days.

(21) Appl. No.: 18/204,894

(22) Filed: Jun. 1, 2023

(51) Int. Cl.
*C02F 1/00* (2023.01)
*C02F 103/00* (2006.01)

(52) U.S. Cl.
CPC .......... *C02F 1/001* (2013.01); *B01D 2221/12* (2013.01); *C02F 2103/001* (2013.01); *C02F 2201/007* (2013.01); *Y02A 20/108* (2018.01)

(58) Field of Classification Search
CPC .......... C02F 1/001; C02F 1/002; C02F 1/003; C02F 2103/002; C02F 2201/007; B01D 2221/12; E02B 3/023; E02B 3/026; Y02A 20/108
USPC .............................................. 210/154, 170.1
See application file for complete search history.

(56) References Cited

U.S. PATENT DOCUMENTS 7,604,737 B2 * 10/2009 Francisco .............. B01D 65/02
210/321.89

FOREIGN PATENT DOCUMENTS

FR 2652839 A1 * 4/1991 .............. E03F 3/046
GB 331442 A * 7/1930 ........... E04D 13/076

OTHER PUBLICATIONS

English translation of FR 2652839 A1 downloaded from espacenet.com. (Year: 1991).*

* cited by examiner

*Primary Examiner* — Terry K Cecil
(74) *Attorney, Agent, or Firm* — Genius Patent APC; Bruce Angus Hare

(57) ABSTRACT

A portable water collection and filtering device is described. Such water may be collected from irrigation runoff (e.g., excess water from a sprinkler system for watering a lawn or other landscaping that may run along a street gutter), rainwater (e.g., water travelling along a roof gutter, through a downspout, etc.). The portable water collection and filtering device may be able to couple to a collection resource such as an empty bottle. In this way, small amounts of runoff may be captured, stored, and utilized (e.g., to water plants). Such captured water may be provided to various other devices and/or systems (e.g., a treatment system, a larger storage unit, etc.).

15 Claims, 15 Drawing Sheets

1200

1500

PORTABLE WATER COLLECTION AND FILTERING DEVICE

BACKGROUND

Rainwater, excess water from irrigation systems, and/or other types of water runoff may be available sporadically and/or at varying locations depending on the source.

Therefore there exists a need for a collection and filtering device that is able to be utilized in a portable manner.

BRIEF DESCRIPTION OF THE SEVERAL VIEWS OF THE DRAWING

The novel features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide a portable device for collecting and filtering water. Such water may be collected from irrigation runoff (e.g., excess water from a sprinkler system for watering a lawn or other landscaping that may run along a street gutter), rainwater (e.g., water travelling along a roof gutter, through a downspout, etc.). The portable water collection and filtering device may be able to couple to a collection resource such as an empty bottle. In this way, small amounts of runoff may be captured, stored, and utilized (e.g., to water plants). Such captured water may be provided to various other devices and/or systems (e.g., a treatment system, a larger storage unit, etc.).

Figure 1:
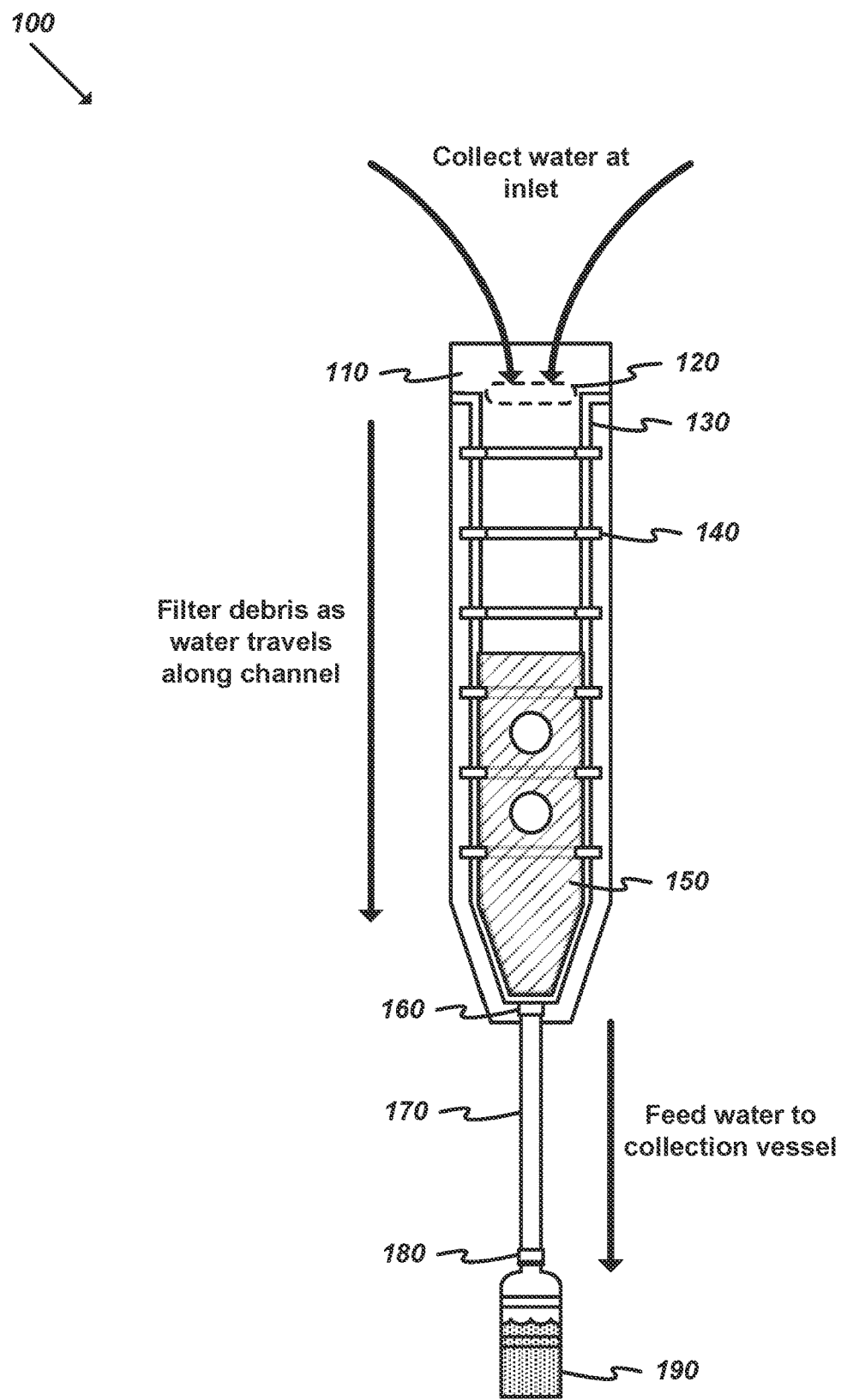
FIG. 1 illustrates top plan view of a portable water collection and filtering device of one or more embodiments described herein.
Figure 2:
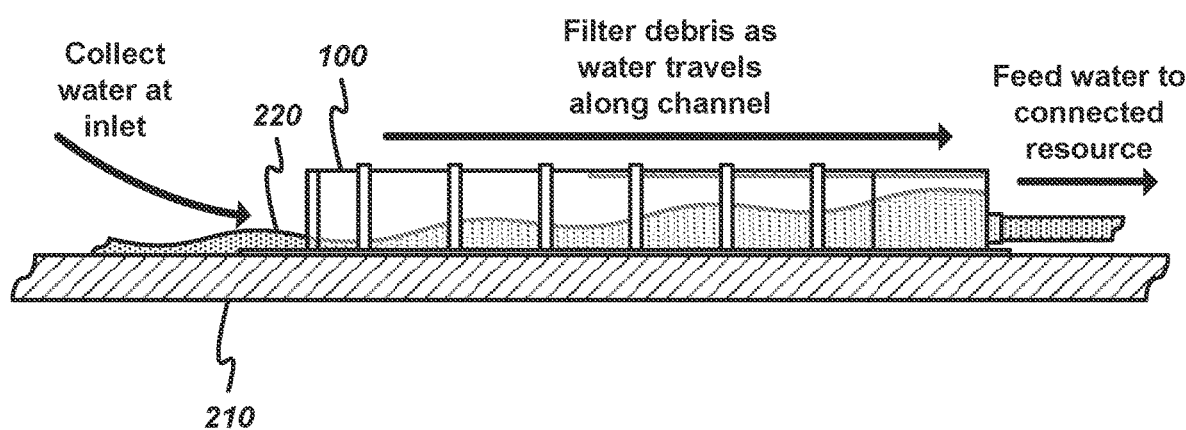
FIG. 2 illustrates a left elevation view of the portable water collection and filtering device of FIG. 1.
Figure 3:
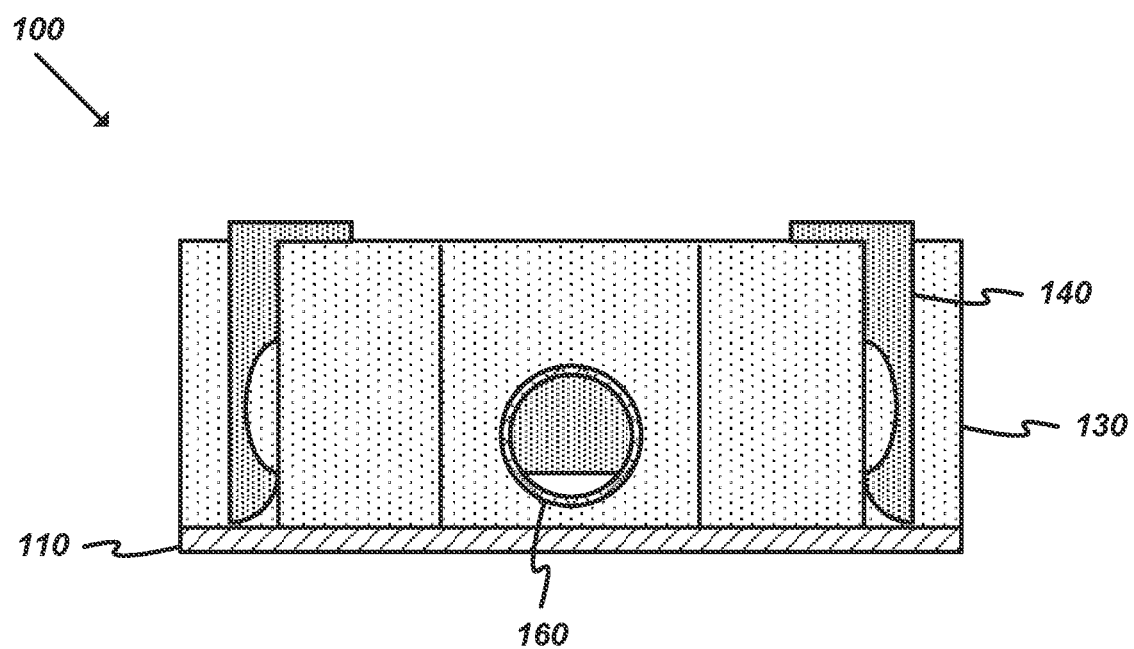
FIG. 3 illustrates a front elevation view of the portable water collection and filtering device of FIG. 1.

FIG. 1 illustrates top plan view of a portable water collection and filtering device 100 of one or more embodiments described herein. FIG. 2 illustrates a left elevation view of the portable water collection and filtering device 100. FIG. 3 illustrates a front elevation view of the portable water collection and filtering device 100. As shown, the example portable water collection and filtering device 100 may include a base 110, an inlet 120, a frame 130, a set of struts 140, a cover 150, an outlet 160, conduit 170, and an output connector 180.

Base 110 may support the various components of portable water collection and filtering device 100 and allow the portable water collection and filtering device 100 to collect water at various locations. In this example, base 110 is flat, but different embodiments may include differently shaped bases 110. For example, a portion of base 110 may be curved (e.g., a "J" curve to match the profile of a typical roof gutter). As another example, at least a portion of base 110 may form a tub shape. In some embodiments, base 110 may have a slanted portion or other features (e.g., feet and/or legs) such that the inlet 120 is elevated relative to the outlet 160. In this way, larger debris may be prevented from entering inlet 120 if there is sufficient water flow to reach the height of the inlet 120.

Base 110 may be made from rigid or semi-rigid waterproof or water-resistant materials, such as stainless steel, aluminum, plastic, composites, etc. Base 110 may have a thickness of about one quarter inch in some embodiments, depending on the attributes of the materials used (e.g., strength, rigidity, etc.). Base 110 may include attachment or retention features (not shown). Such attachment or retention features may include, for example, through-holes (e.g., to attach wires, ropes, hooks, strings, etc.), legs (e.g., metal or plastic poles or posts that protrude from base 110), feet (e.g., rubber or silicone pads attached to the underside of base 110), ridges (e.g., a sawtooth ratchet shape along a portion of the bottom of base 110), and/or other appropriate features that prevent unwanted movement of the portable water collection and filtering device 100 during setup and/or use. Base 110 may have a complementary shape to frame 130 as shown. In some embodiments, base 110 may be formed from multiple modular base portions that may be coupled together using various fasteners.

Inlet 120 may be an open area of portable water collection and filtering device 100 that may allow flowing water to be collected. In this example, inlet 120 is defined by the open end of frame 130.

Frame 130 may couple to base 110 in various appropriate ways (e.g., via adhesive, fasteners such as screws and/or bolts, via complementary protuberances and receptacles such as slots and tabs or posts and holes, etc.). In some embodiments, base 110 may include a complementary slot or groove that accepts from portion of the wall of frame 130 (e.g., the bottom one-sixteenth or one-eight inch of frame 130). In some embodiments, frame 130 and base 110 may be formed from a single piece of material, such as metal, molded or injection-molded plastic, or composites. Frame 130 may include, provide, and/or at least partly form wall sections that may form, along with base 110, a portion of a water channel as shown. Frame 130 may be made from rigid or semi-rigid waterproof or water-resistant materials, such as stainless steel, aluminum, plastic, composites, etc. As shown, frame 130 may form a channel (such as the generally rectangular channel of this example) with an open end or region forming the collection inlet 120 and a closed end with one or more ports that form at least one outlet 160. In this example, one end of the channel has a triangular shape such that fluid is fed toward the outlet 160. Frame 130 may have a modified "U" or "V" shape as shown, such that a portion of the frame may form a water channel and water pressure may be increased toward the outlet 160.

Each strut 140 may couple to the frame 130 and/or base 110 and may provide structural rigidity to portable water collection and filtering device 100. The struts 140 may filter water as the water flows along the channel. For instance, holes or gaps in the struts 140 may allow water to pass but prevent debris such as pebbles or stones, leaves, sticks, etc. from moving along the channel. Exemplary struts 140 will be described in more detail in reference to FIG. 7 and FIG. 8 below.

Cover 150 may cover at least a portion of the channel formed by base 110 and frame 130. In this example, cover 150 covers roughly half of the channel. The cover 150 may include regions that accept at least a portion of each strut 140 as shown. An exemplary cover 150 will be described in more detail in reference to FIG. 9 below.

Outlet 160 may allow water to pass from the channel formed by base 110 and frame 130 to a resource such as conduit 170. In some embodiments, outlet 160 may be associated with a complementary cap, stopper, or similar element that may allow water to be retained at the portable water collection and filtering device 100 for transfer to a storage vessel or other usage. Some embodiments of the portable water collection and filtering device 100 may include multiple outlets 160 and/or the outlet 160 may be located at a different region of the portable water collection and filtering device 100 than shown. In some embodiments, outlet 160, frame 130, and/or base 110 may be formed from a single piece of material, such as metal, plastic, or composites. Outlet 160 may be made from rigid or semi-rigid waterproof or water-resistant materials, such as stainless steel, aluminum, plastic, composites, etc. In this example, outlet 160 is round, but different embodiments may include outlets 160 having different shapes (e.g., rectangular, oval, square, polygonal, etc.). Outlet 170 may include, utilize, and/or be associated with connection elements such as threaded regions, gaskets, seals, clamps, conduit (e.g., conduit 170), etc.

Conduit 170 may include, be, or utilize, for example, pipe, tubing, connectors, and/or other components able to convey fluid such as water. In this example, conduit 170 may include flexible tubing. Such tubing may be clear in some embodiments such that users are able to evaluate flow rate and/or other attributes of operation. Conduit 170 may include connectors such as "Y" junctions and/or other such components that may allow the output of portable water collection and filtering device 100 to be fed to multiple collection vessels 190, other collection resources, and/or for direct usage.

Conduit 170 may include, be, be coupled to, and/or otherwise utilize one or more filtering devices or elements that may be appropriate for filtering captured water. For instance, conduit 170 may include screens or woven fabrics to remove debris, activated carbon filters to absorb contaminants, ceramic layers that provides submicron filtration, a sterilization layer that includes colloidal silver, and/or other appropriate filtering elements or combinations of filtering elements.

Output connector 180 may allow the water fed through the portable water collection and filtering device 100 to be provided to various collection vessels 190 and/or other resources. For example, output connector 180 may be able to couple to various bottles having a threaded neck (e.g., empty plastic bottles previously used to store drinking water).

Each collection vessel 190 may be any vessel or container that is able to retain water. Example collection vessels 190 may include bottles, jugs, cans, buckets, canteens, etc. Different embodiments of the portable water collection and filtering device 100 may be optimized for use with different types of collection vessels. For instance, many of the examples described herein may be optimized for use with relatively small vessels 190 (e.g., up to one liter) having a standard threaded neck portion.

During use, the portable water collection and filtering device 100 may be placed on a surface 210 associated with flowing water (e.g., a roadside gutter, a runoff channel, etc.) while the water 220 may be collected via inlet 120. In this example, height of the water 220 increases as water moves along the channel and pressure increases. The height variation is exaggerated for clarity. Flowing water may be a "trickle" or have a relatively low flow rate in some cases, where the inlet 120 is nonetheless able to collect enough water to at least partially fill a collection vessel 190 over time. For higher flow rates, the portable water collection and filtering device 100 may include one or more overflow outlet or port (e.g., a circular hole located near outlet 160, along conduit 170, and/or other appropriate locations), collection vessel 190 may include an overflow outlet or port, and/or excess water may simply pass inlet 120 without being collected if the channel is full enough.

Figure 4:
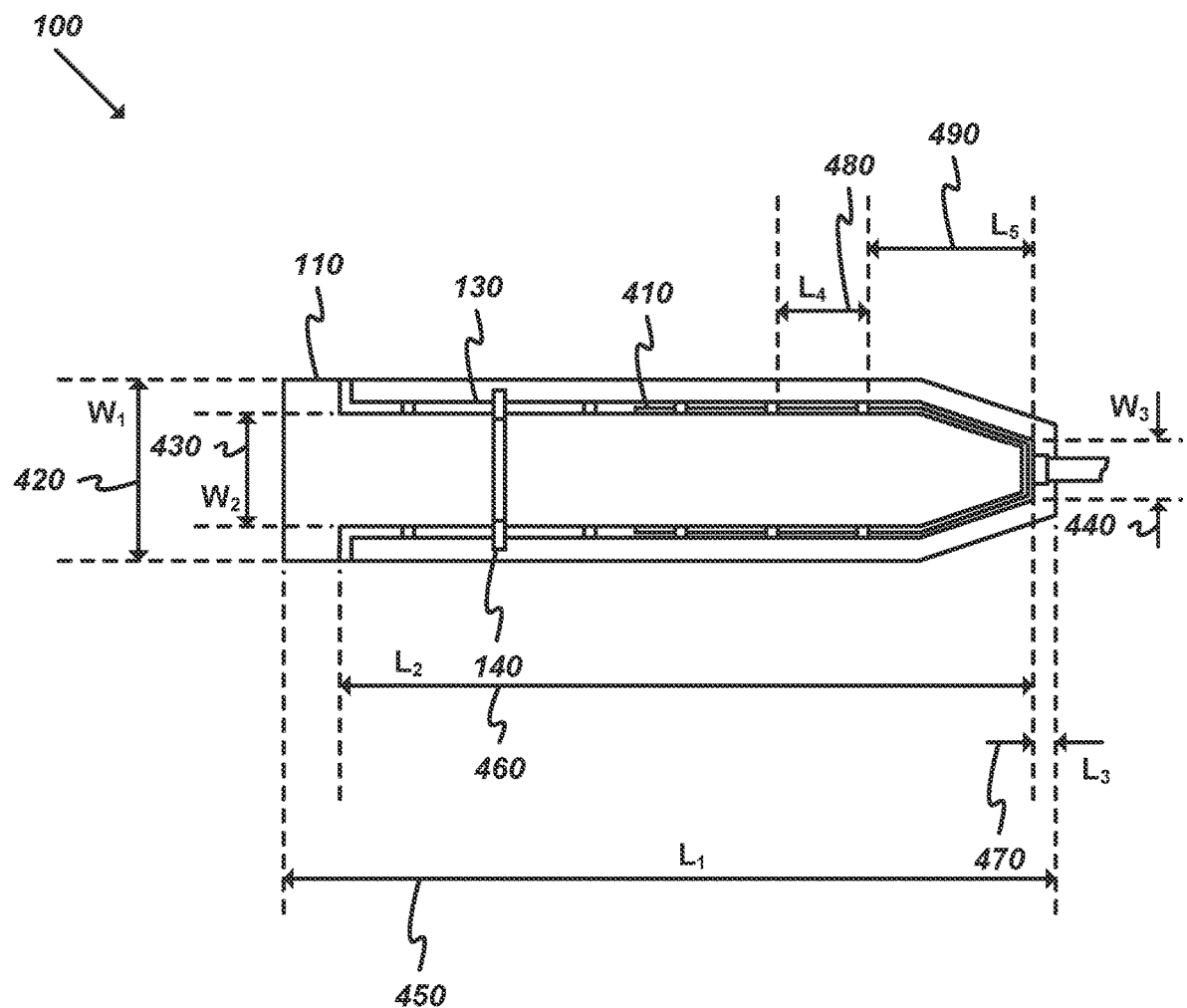
FIG. 4 illustrates a top plan view of the portable water collection and filtering device of FIG. 1.

FIG. 4 illustrates a top plan view of a portable water collection and filtering device 100. The cover 150 and most of the struts 140 have been omitted for clarity.

In this example, recess 410 is shown. Recess 410 may be able to accept a portion of cover 150. Recess 410 may include features such as ridges or tabs (not shown) that may retain the cover 150 in place during use.

As shown, the portable water collection and filtering device 100 may have an overall width $W_1$ 420, a channel width $W_2$ 430, and a neck width $W_3$ 440. Overall width $W_1$ 420 may be about two-and-three-quarters inches in this example. Channel width $W_2$ 430 may be about one-and-three-quarters inches. Neck width $W_3$ 440 may be about one inch.

As shown, the portable water collection and filtering device 100 may have an overall length $L_1$ 450, a frame length $L_2$ 460, an outlet offset $L_3$ 470, strut spacing $L_4$ 480, and a strut offset $L_5$ 490. Overall length $L_1$ 450 may be about twelve inches in this example. Frame length $L_2$ 460 may be about eleven-and-one-eighth inches. Outlet offset $L_3$ 470 may be about three-eighths of an inch. Strut spacing $L_4$ 480 may be about one-and-three-eighths inches. Strut offset $L_5$ 490 may be about two-and-one-half inches.

Relative sizing of the portable water collection and filtering device 100 may be specified by equations (1)-(8) below, where the ratios are indicated by reference to a unit length associated with $L_4$ 480 and may be associated with various tolerances or deviations (e.g., plus or minus one-quarter inch or plus or minus one-eighth of a ratio unit):

| | | | |
|---|---|---|---|
| $W_1$ 420 | = | 2.0 | (1) |
| $W_2$ 430 | = | 1.25 | (2) |
| $W_3$ 440 | = | 0.625 | (3) |
| $L_1$ 450 | = | 8.5 | (4) |
| $L_2$ 460 | = | 7.875 | (5) |
| $L_3$ 470 | = | 0.25 | (6) |
| $L_4$ 480 | = | 1.0 | (7) |
| $L_5$ 490 | = | 1.8125 | (8) |

Figure 5:
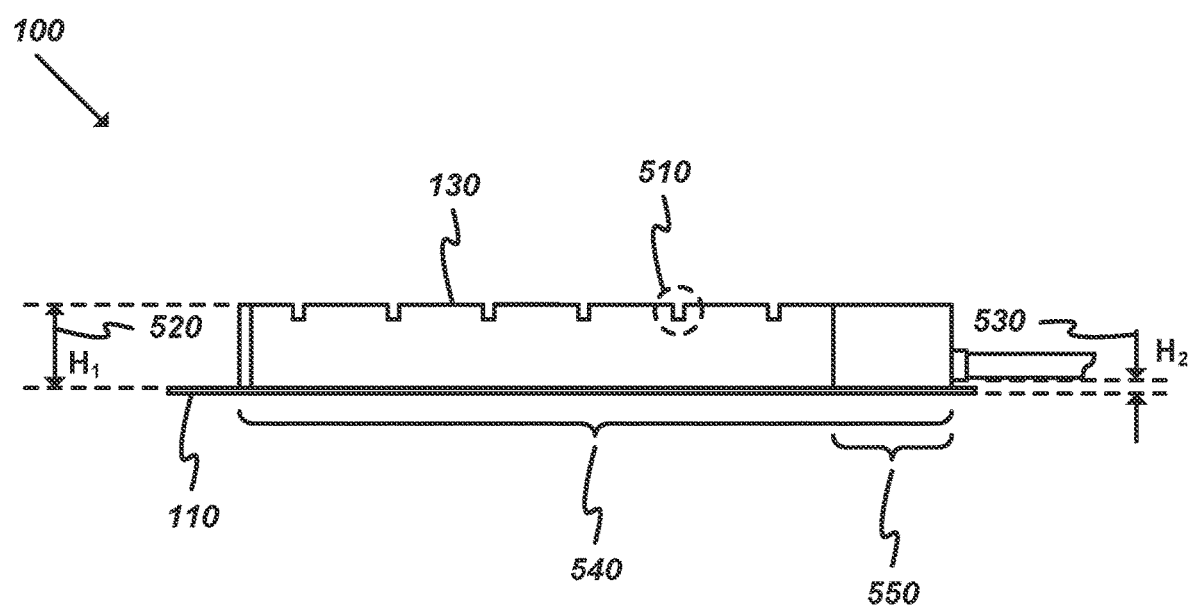
FIG. 5 illustrates a left elevation view of the portable water collection and filtering device of FIG. 1.

FIG. 5 illustrates a left elevation view of a portable water collection and filtering device 100. The cover 150 and the struts 140 have been omitted for clarity.

In this example, receptacles 510 are shown. Each receptacle 510 may be able to accept a portion of a strut 140. Receptacle 510 may include features such as ridges or tabs (not shown) that may retain the struts 140 in place during use. In some embodiments, receptacle 510 may include, utilize, or otherwise be associated with one or more seals, gaskets, etc., that may help retain water within the channel of portable water collection and filtering device 100. In this example, each receptacle 510 may be about one quarter inch deep and one quarter inch wide. The receptacles 510 may be sized such that the strut 140 is securely held via the receptacles 510.

As shown, the portable water collection and filtering device 100 may have a wall or channel height $H_1$ 520 and an outlet offset $H_2$ 530. Channel height or wall height $H_1$ 520 may be about one-and-one-quarter inches in this example. Outlet offset $H_2$ 530 may be about one quarter inch.

Relative sizing of the portable water collection and filtering device 100 may be specified by equations (9)-(10) below, where the ratios are indicated by reference to a unit length associated with $L_4$ 480 and may be associated with various tolerances or deviations (e.g., plus or minus one-quarter inch or plus or minus one-eighth of a ratio unit):

| | | | |
|---|---|---|---|
| $H_1$ 520 | = | 0.875 | (9) |
| $H_2$ 530 | = | 0.1875 | (10) |

In this example, the water "channel" 540 provided by portable water collection and filtering device 100 may include the interior region formed by the walls of frame 130 and base 110 along at least a portion of frame length $L_2$ 460 (and excluding the wall thickness near outlet 160). In this example, the water channel 540 includes a tapered outlet or "nose" portion 550.

The dimensions and ratios provided herein may be associated with a portable water collection and filtering device 100 intended for use at a roadside gutter, and/or other exemplary portable water collection and filtering devices described herein. One of ordinary skill in the art will recognize that different embodiments may be sized differently for different intended usage scenarios and/or based on other relevant factors (e.g., portability, packability, etc.). Such sizing differences may include different dimensions and/or ratios of dimensions than those described herein. For instance, a portable water collection and filtering device 100 intended for use with roadside gutters may have different sizing than a portable water collection and filtering device 100 intended for use with a supply source such as a brook or stream. As another example, a portable water collection and filtering device 100 intended for use during camping may include modular elements that allow the portable water collection and filtering device 100 to be at least partly disassembled for storage and transport.

Figure 6:
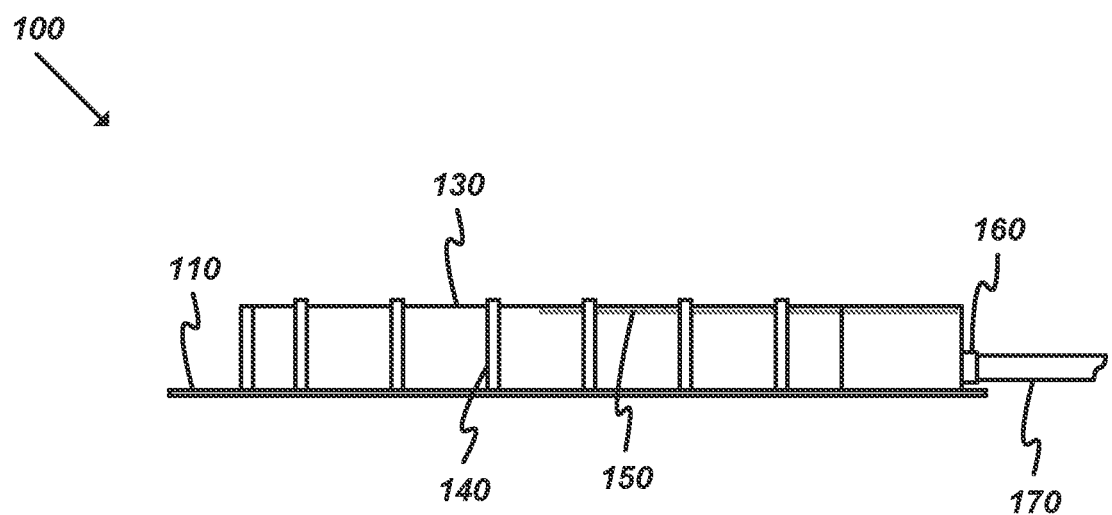
FIG. 6 illustrates a left elevation view of the portable water collection and filtering device of FIG. 1.

FIG. 6 illustrates a left elevation view of a portable water collection and filtering device 100. In this example, the height of struts 140 is slightly greater than channel height $H_1$ 520.

Figure 7:
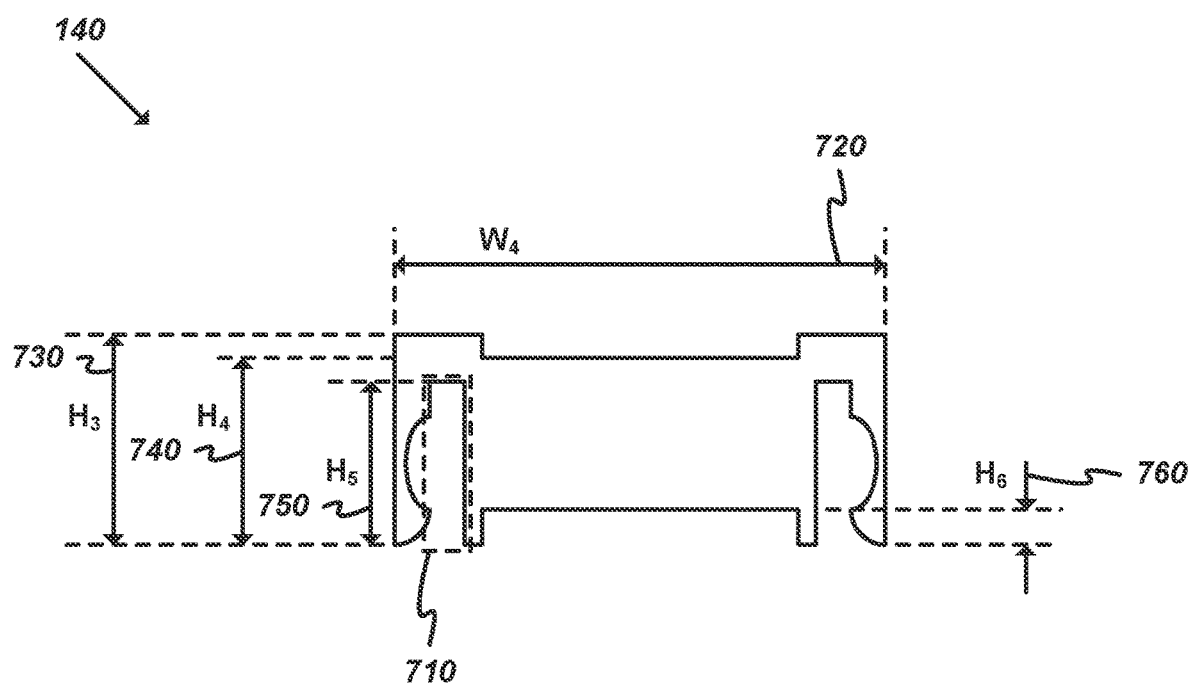
FIG. 7 illustrates a front elevation view of a strut of one or more embodiments described herein.

FIG. 7 illustrates a front elevation view of a strut 140 of one or more embodiments described herein. Struts 140 may be coupled to frame 130 via compression along the interior of the slots. Such a configuration may allow the struts 140 to be removable for easy cleaning (e.g., to remove collected debris from the channel). As shown, strut 140 may include a pair of slots 710 that each accept a portion of the frame 130. The area above each slot 710 may engage with receptacle 510.

As shown, the strut 140 may have an overall width $W_4$ 720, an overall height $H_3$ 730, a center height $H_4$ 740, a slot height $H_5$ 750, and a channel height $H_6$ 760. Overall width $W_4$ 720 may be about three-and-one-eighth inches in this example. Overall height $H_3$ 730 may be about one-and-one-quarter inches. Center height $H_4$ 740 may be about one-and-one-eighth inches. Slot height $H_5$ 750 may be about one inch. Channel height $H_6$ 760 may be about one quarter inch.

Relative sizing of the portable water collection and filtering device 100 may be specified by equations (11)-(14) below, where the ratios are indicated by reference to a unit length associated with $L_4$ 480 and may be associated with various tolerances or deviations (e.g., plus or minus one-quarter inch or plus or minus one-eighth of a ratio unit):

| | | | |
|---|---|---|---|
| $W_4$ 720 | = | 2.1875 | (11) |
| $H_3$ 730 | = | 0.9375 | (12) |
| $H_4$ 740 | = | 0.8125 | (13) |
| $H_5$ 750 | = | 0.75 | (14) |
| $H_6$ 760 | = | 0.1875 | (15) |

Each strut 140 may have a thickness or depth of about one quarter inch. The clip shape of the strut 140 on the outer portion of slots 710 (also referred to as the "retention clip portion" of the strut) may allow the strut 140 to securely couple to frame 130 while being easy to remove for cleaning, disassembly, or other maintenance. In some embodiments, channel height $H_6$ 760 may be varied across the struts 140 such that larger debris may be removed at a first strut 140, while subsequent struts 140 may have successively lower channel heights $H_6$ 760 that may remove smaller and smaller debris. Some embodiments may utilize struts 140 having a same channel height $H_6$ 760 across all struts for ease of assembly, manufacture, etc.

Different embodiments may utilize various different size ratios depending on various relevant factors, such as desired size, weight, or other relevant attributes of the portable water collection and filtering device 100. As another example, the specified ratios may vary depending on desired throughput, expected collection vessel size, and/or other relevant attributes related to performance of the portable water collection and filtering device 100.

Figure 8:
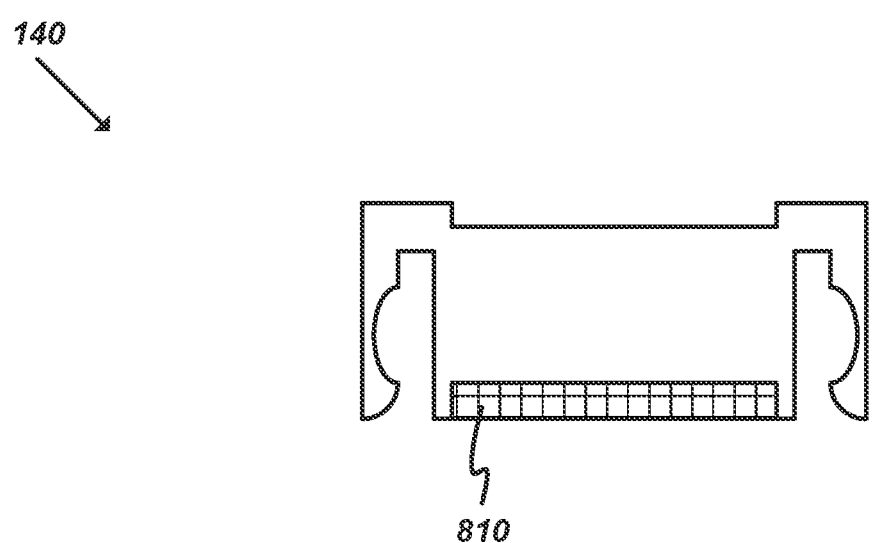
FIG. 8 illustrates a front elevation view of an alternative strut of one or more embodiments described herein.

FIG. 8 illustrates a front elevation view of an alternative strut 140 of one or more embodiments described herein. In this example, the strut 140 may include a filter 810 across the channel slot region of strut 140. Such a filter may include, for instance, a screen or woven fabric, wadded felt or similar material, charcoal, and/or other elements that may be able to remove debris and/or contaminants from captured water as it travels along the channel 540.

In some embodiments, struts 140, frame 130, and/or base 110 may be formed from a single piece of material, such as metal, plastic, or composites. Each strut 140 may be made from rigid or semi-rigid waterproof or water-resistant materials, such as stainless steel, aluminum, plastic, composites, etc.

Figure 9:
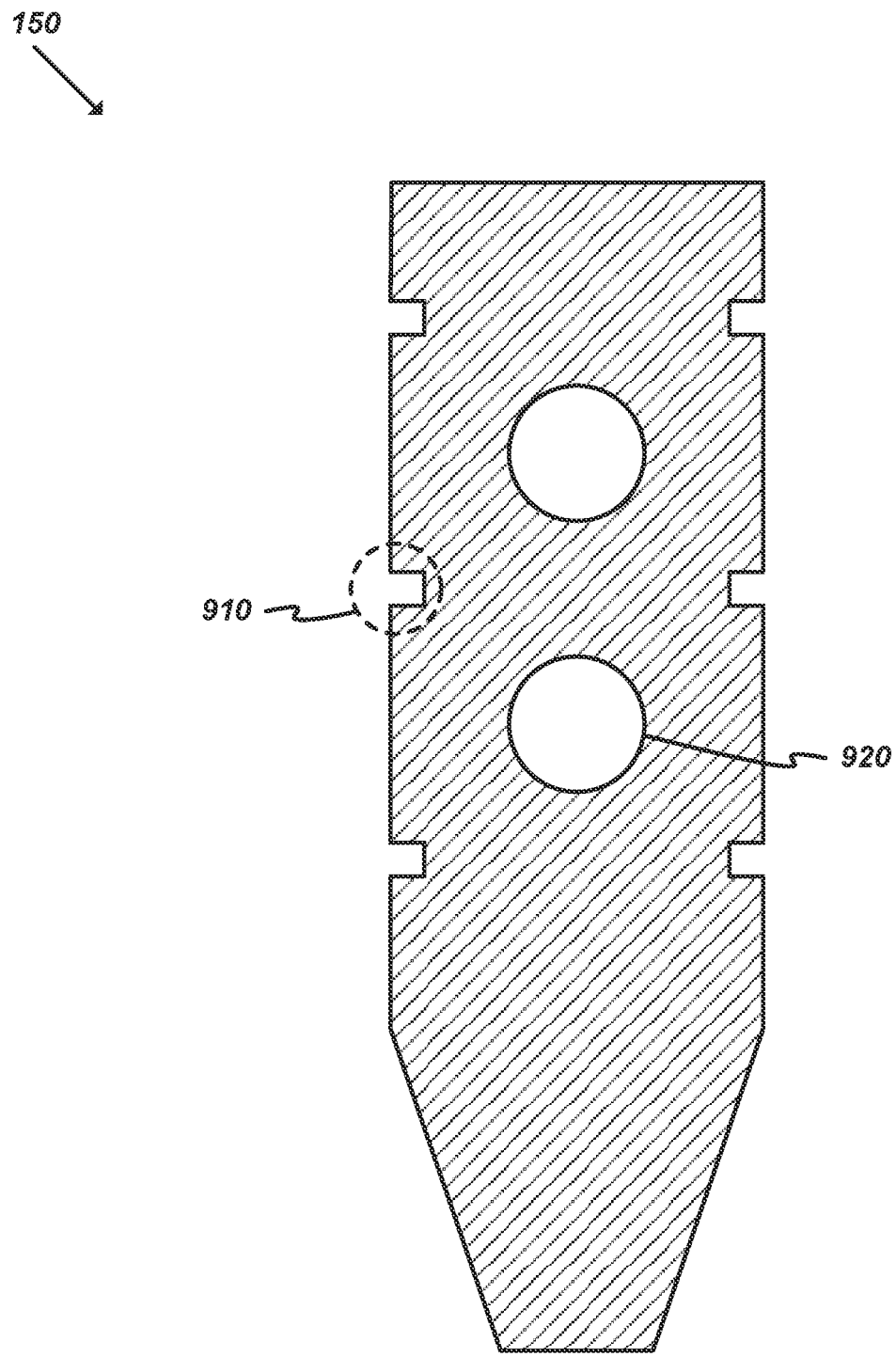
FIG. 9 illustrates a top plan view of a cover of one or more embodiments described herein.

FIG. 9 illustrates a top plan view of a cover 150 of one or more embodiments described herein. As shown, the cover 150 may include a set of notches 910 and one or more user engagement features 920.

Each notch 910 may be about one quarter inch deep and one quarter inch wide in some embodiments and may be able to accept a portion of a strut 140. At least a portion of the outer edge of cover 150 may engage with recess 410, which may have a complementary shape to the cover 150.

In this example, there are two user engagement features 920 that may allow a user to grasp the cover 150 (e.g., using a thumb and one or more forefingers) and remove the cover 150 from, or attach the cover 150 to, the frame 120, struts 140, and/or other elements of the portable water collection and filtering device 100. Different embodiments may include different numbers of user engagement features 920 (e.g., one, two, three, etc.), differently sized user engagement features 920, differently shaped user engagement features 920, and/or other appropriate user engagement features 920 (e.g., posts, handles, strings or straps, etc.).

Cover 150 may be made from rigid or semi-rigid waterproof or water-resistant materials, such as stainless steel, aluminum, plastic, composites, etc. In some embodiments, cover 150 may be made from transparent or semi-transparent material such that a user may evaluate water flow along channel 540, see accumulated debris, etc. In some embodiments, cover 150 may be about one sixteenth of an inch thick.

Figure 10:
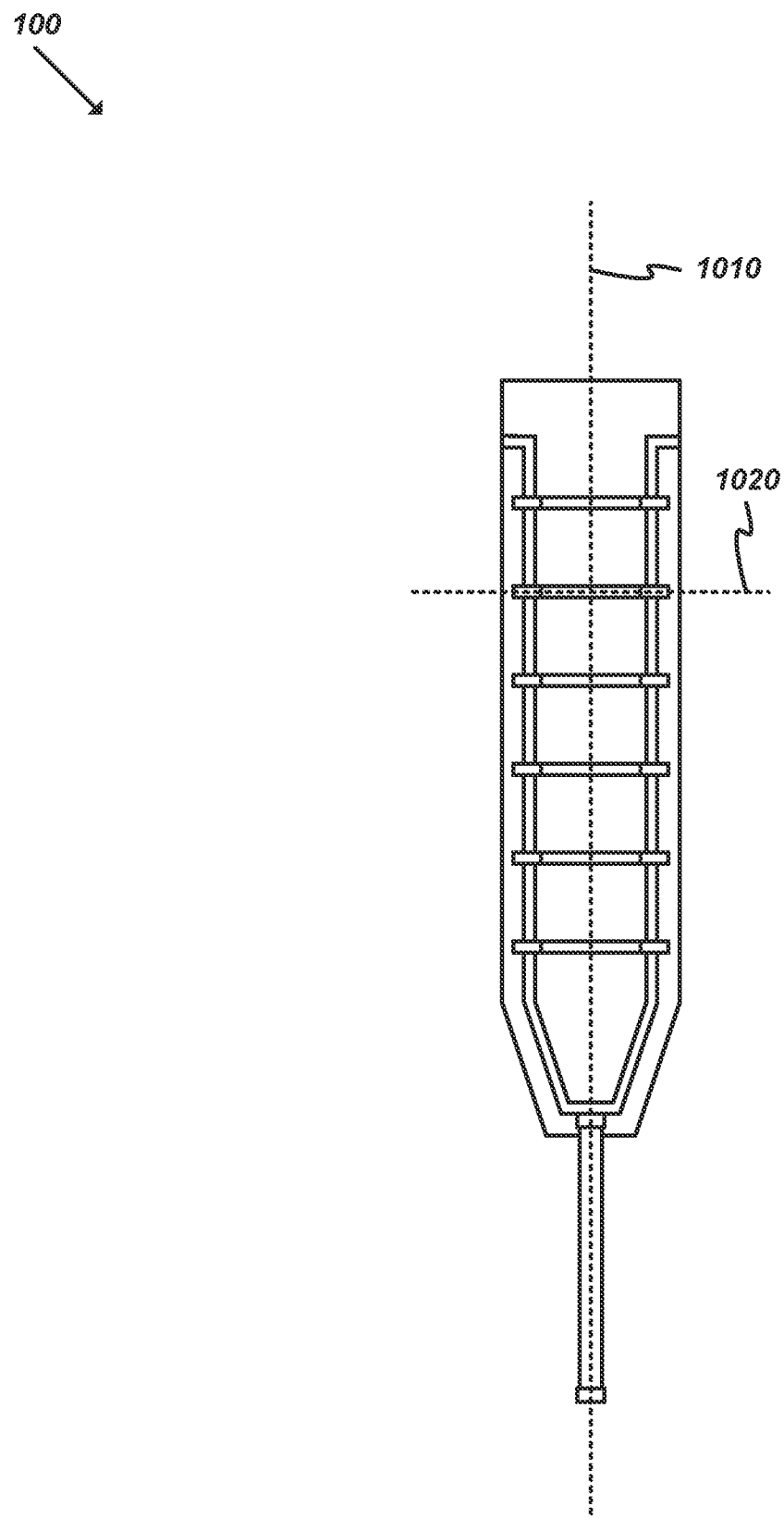
FIG. 10 illustrates a top plan view of the portable water collection and filtering device of FIG. 1.

FIG. 10 illustrates a top plan view of a portable water collection and filtering device 100. As shown, the portable water collection and filtering device 100 may be symmetrical about line 1010 which is vertical in this view. Line 1020 is perpendicular to line 1010 and may be parallel to a center line of strut 140 as shown.

Figure 11:
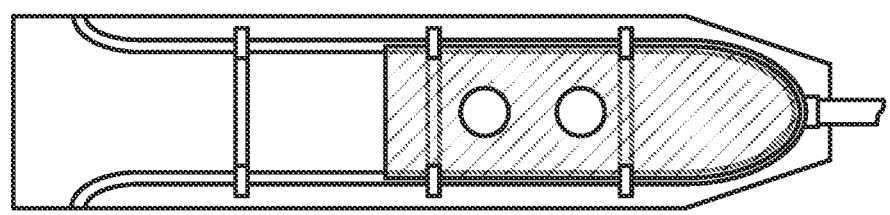
FIG. 11 illustrates a top plan view of an alternative portable water collection and filtering device of one or more embodiments described herein.

FIG. 11 illustrates a top plan view of an alternative portable water collection and filtering device 1100 of one or more embodiments described herein. In this example, frame 130 has a curved or rounded shape and alternative portable water collection and filtering device 1100 has fewer struts 140 than shown with example portable water collection and filtering device 100.

Figure 12:
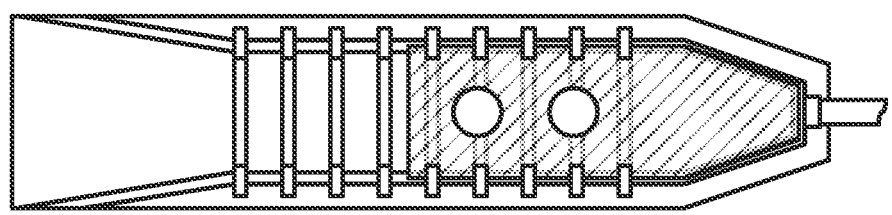
FIG. 12 illustrates a top plan view of another alternative portable water collection and filtering device of one or more embodiments described herein.

FIG. 12 illustrates a top plan view of another alternative portable water collection and filtering device 1200 of one or more embodiments described herein. In this example, inlet 120 has a triangular shape and extends farther along the alternative portable water collection and filtering device 1200 than the example of portable water collection and filtering device 100. In addition, portable water collection and filtering device 1200 has more struts 140 than shown with example portable water collection and filtering device 100

Figure 13:
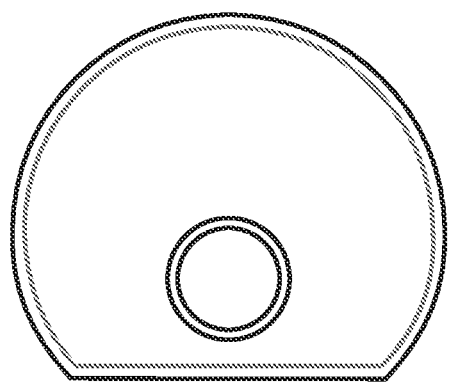
FIG. 13 illustrates a front elevation view of another alternative portable water collection and filtering device of one or more embodiments described herein.

FIG. 13 illustrates a front elevation view of another alternative portable water collection and filtering device 1300 of one or more embodiments described herein. In this example, the alternative portable water collection and filtering device 1300 may have a generally cylindrical shape with an optional flat portion that may serve as the base 110. The alternative portable water collection and filtering device 1300 may be formed using a standard pipe (e.g., a two-inch diameter pipe). Struts 140 associated with alternative portable water collection and filtering device 1300 may be circular (with a flat edge if appropriate) and may be aligned along a center post or other structural member that may retain the struts 140 in a fixed position relative to the alternative portable water collection and filtering device 1300. Each of the struts 140 may have one or more through-holes or similar elements that may allow water to flow along the alternative portable water collection and filtering device 1300.

Figure 14:
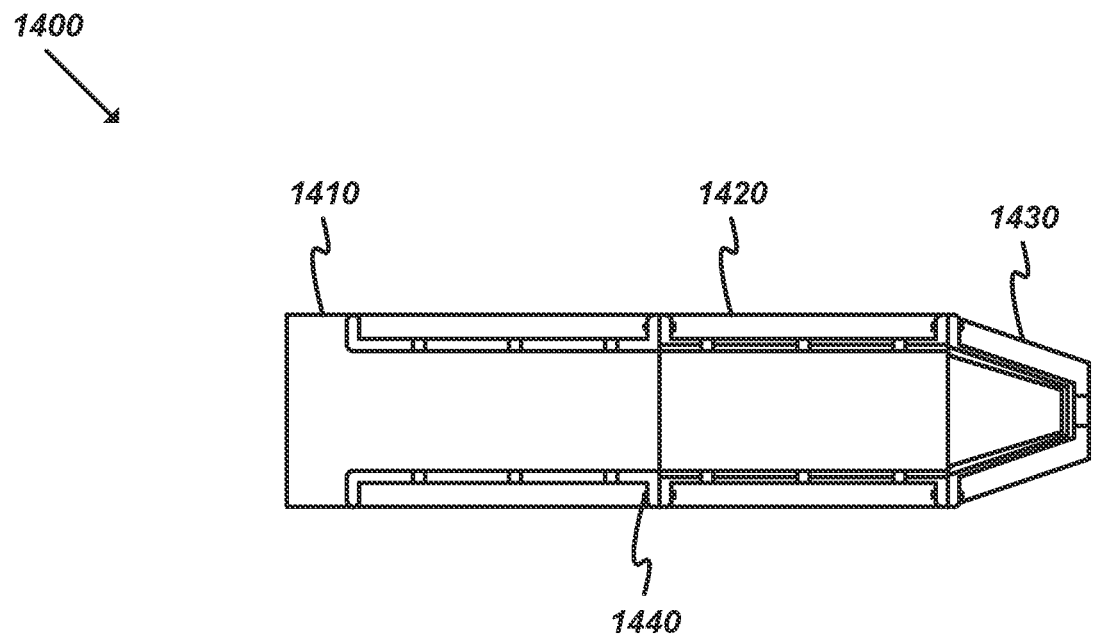
FIG. 14 illustrates a top plan view of a modular portable water collection and filtering device of one or more embodiments described herein.
Figure 15:
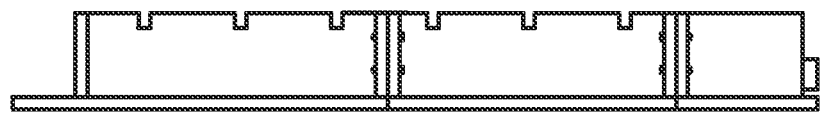
FIG. 15 illustrates a left elevation view of the modular portable water collection and filtering device of FIG. 14.

FIG. 14 illustrates a top plan view of a modular portable water collection and filtering device 1400 of one or more embodiments described herein. FIG. 15 illustrates a left elevation view of the modular portable water collection and filtering device 1400.

In this example, the portable water collection and filtering device 1400 includes three modules 1410, 1420, and 1430 that may be coupled together using fasteners 1440. Different embodiments may have different numbers of modules, depending on various relevant factors (e.g., desired size, intended usage scenarios, etc.).

In this example, each modular section 1410-1430 may be a single piece of plastic or other appropriate material that may include base portions and frame portions.

Fasteners 1440 may include a nut and bolt in this example. Different embodiments may utilize different types of fasteners 1440 (e.g., screws, straps, clasps, buttons, slots and tabs or other complementary connectors, etc.).

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used. Further, the phrase "based on" is intended to mean "based, at least in part, on" unless explicitly stated otherwise.

The foregoing relates to illustrative details of exemplary embodiments and modifications may be made without departing from the scope of the disclosure. Even though particular combinations of features are recited in the claims and/or disclosed in the specification, these combinations are not intended to limit the possible implementations of the disclosure. In fact, many of these features may be combined in ways not specifically recited in the claims and/or disclosed in the specification. For instance, although each dependent claim listed below may directly depend on only one other claim, the disclosure of the possible implementations includes each dependent claim in combination with every other claim in the claim set.

I claim:

1. A portable water collection and filtering device comprising:
   an inlet;
   a water channel comprising:
      a base;
      a frame coupled to the base, the frame comprising a set of frame walls; and
      a set of struts coupled to the frame, wherein each strut from the set of struts comprises a pair of coupling slots engaging and extending over opposite frame walls and a channel slot between the coupling slots that forms a channel height between the base and the channel slot allowing water to flow along the water channel; and
   an outlet, wherein the channel height associated with each strut from the set of struts decreases along the water channel from the inlet to the outlet.

2. The portable water collection and filtering device of claim 1 further comprising a threaded output connector able to couple to a threaded bottle neck.

3. The portable water collection and filtering device of claim 1 further comprising a cover.

4. The portable water collection and filtering device of claim 3, wherein the cover couples to the frame via a recess of the frame.

5. The portable water collection and filtering device of claim 1, wherein the water channel comprises a tapered portion coupled to the outlet that causes increasing water pressure as water flows along the tapered section from the inlet to the outlet.

6. A portable water collection and filtering device comprising:
  an inlet;
  a water channel comprising:
    a flat base;
    a frame that is symmetrical about a center axis, the frame comprising a set of frame walls; and
    a set of struts coupled to the frame, wherein each strut from the set of struts comprises a pair of coupling slots engaging and extending over opposite frame walls and a channel slot between the coupling slots that forms a channel height between the base and the channel slot allowing water to flow along the water channel; and
  an outlet coupled to the frame,
  wherein the channel height associated with each strut from the set of struts decreases along the water channel from the inlet to the outlet.

7. The portable water collection and filtering device of claim 6, wherein the flat base and the frame are formed from a single piece of molded plastic.

8. The portable water collection and filtering device of claim 6, wherein each strut in the set of struts is perpendicular to the center axis.

9. The portable water collection and filtering device of claim 6 further comprising a cover that couples to the frame.

10. The portable water collection and filtering device of claim 6 further comprising a conduit coupled to the outlet.

11. The portable water collection and filtering device of claim 10 further comprising a threaded connector able to couple to a threaded bottle neck.

12. A modular portable water collection device comprising:
  a water channel comprising:
    a first module having an inlet, a first base section, and first frame section;
    a second module that selectively couples to the first module, the second module having a second base section and second frame section;
    a third module that selectively couples to the second module, the third module having a third base section, third frame section, and an outlet; and
    a set of struts, wherein each strut from the set of struts comprises a pair of coupling slots engaging and extending over opposite frame walls of the first frame section or the second frame section and a channel slot between the coupling slots that forms a channel height between the base and the channel slot allowing water to flow along the water channel,
  wherein the channel height associated with each strut from the set of struts decreases along the water channel from the inlet to the outlet.

13. The modular portable water collection device of claim 12, wherein the first module is able to be selectively coupled to the second module via a first set of fasteners and the second module is able to be selectively coupled to the third module via a second set of fasteners.

14. The modular portable water collection device of claim 12, wherein each strut in the set of struts comprises a retention clip portion that is able to engage a portion of the first frame section or the second frame section.

15. The modular portable water collection device of claim 12, wherein the outlet is coupled to a conduit that provides water to an associated collection vessel.

* * * * *